US012791889B2

(12) United States Patent
Alidra et al.

(10) Patent No.: US 12,791,889 B2
(45) Date of Patent: Nov. 10, 2026

(54) METHOD FOR CONTROLLING AN OPACIFYING GLAZING FOR A MOTOR VEHICLE

(71) Applicants: RENAULT S.A.S, Boulogne Billancourt (FR); NISSAN MOTOR CO., LTD., Kanagawa (JP)

(72) Inventors: Ludovic Alidra, Guyancourt (FR); Samuel Campana, Guyancourt (FR); Maurin Isnard, Guyancourt (FR); Delphine Lopez, Guyancourt (FR); Yann Ollivier, Guyancourt (FR); Brigitte Savariault, Guyancourt (FR)

(73) Assignees: RENAULT S.A.S, Boulogne Billancourt (FR); NISSAN MOTOR CO., LTD., Kanagawa (JP)

( * ) Notice: Subject to any disclaimer, the term of this patent is extended or adjusted under 35 U.S.C. 154(b) by 255 days.

(21) Appl. No.: 18/580,217

(22) PCT Filed: Jun. 30, 2022

(86) PCT No.: PCT/EP2022/068148
§ 371 (c)(1),
(2) Date: Jan. 18, 2024

(87) PCT Pub. No.: WO2023/001523
PCT Pub. Date: Jan. 26, 2023

(65) Prior Publication Data

US 2024/0329444 A1 Oct. 3, 2024

(30) Foreign Application Priority Data

Jul. 21, 2021 (FR) ...................................... 2107870

(51) Int. Cl.
*G02F 1/133* (2006.01)
*B60J 3/04* (2006.01)
(Continued)

(52) U.S. Cl.
CPC ............ *G02F 1/13312* (2021.01); *B60J 3/04* (2013.01); *G02F 1/1334* (2013.01); *G02F 1/137* (2013.01); *E06B 2009/2464* (2013.01)

(58) Field of Classification Search
CPC .... G02F 1/13312; G02F 1/1334; G02F 1/137; B60J 3/04; E06B 2009/2464
See application file for complete search history.

(56) References Cited

U.S. PATENT DOCUMENTS 9,365,161 B2 * 6/2016 Mannheim Astete ..... B60J 3/04
2015/0367782 A1 12/2015 Mannheim Astete et al.

FOREIGN PATENT DOCUMENTS

DE 10 2019 129 399 A1 5/2021
JP JHP03121414 A 5/1991
(Continued)

OTHER PUBLICATIONS

International Search Report mailed on Sep. 14, 2022 in PCT/EP2022/068148 filed on Jun. 30, 2022.
(Continued)

*Primary Examiner* — David Y Chung
(74) *Attorney, Agent, or Firm* — Oblon, McClelland, Maier & Neustadt, L.L.P.

(57) ABSTRACT

A method for controlling an opacifying glazing for a motor vehicle, at least one portion of the glazing including a plurality of zones, the level of opacity of each zone being individually controlled to vary between a minimum value and a maximum value, the plurality of zones being arranged with increasing sequence numbers i in a first direction, the method including the following steps: increasing the opacity of the glazing, which includes increasing the opacity level of each zone according to increasing functions of time, the increases being initialized zone after zone according to their increasing or decreasing sequence numbers i; and/or, reducing the opacity of the glazing, which includes reducing the
(Continued)

opacity level of each zone according to decreasing functions of time, the reductions being initialized zone after zone according to their increasing or decreasing sequence numbers i.

14 Claims, 12 Drawing Sheets

(51) Int. Cl.

| | |
|---|---|
| ***E06B 9/24*** | (2006.01) |
| ***G02F 1/1334*** | (2006.01) |
| ***G02F 1/137*** | (2006.01) |

(56) References Cited

FOREIGN PATENT DOCUMENTS

| | | | |
|---|---|---|---|
| JP | 2008-222045 | A | 9/2008 |
| JP | 2021-184062 | A | 12/2021 |
| WO | WO 2019/082572 | A1 | 5/2019 |

OTHER PUBLICATIONS

Preliminary French Search Report dated Mar. 25, 2022 in French Application 2107870 filed on Jul. 21, 2021.

* cited by examiner

Fig. 9 continuation
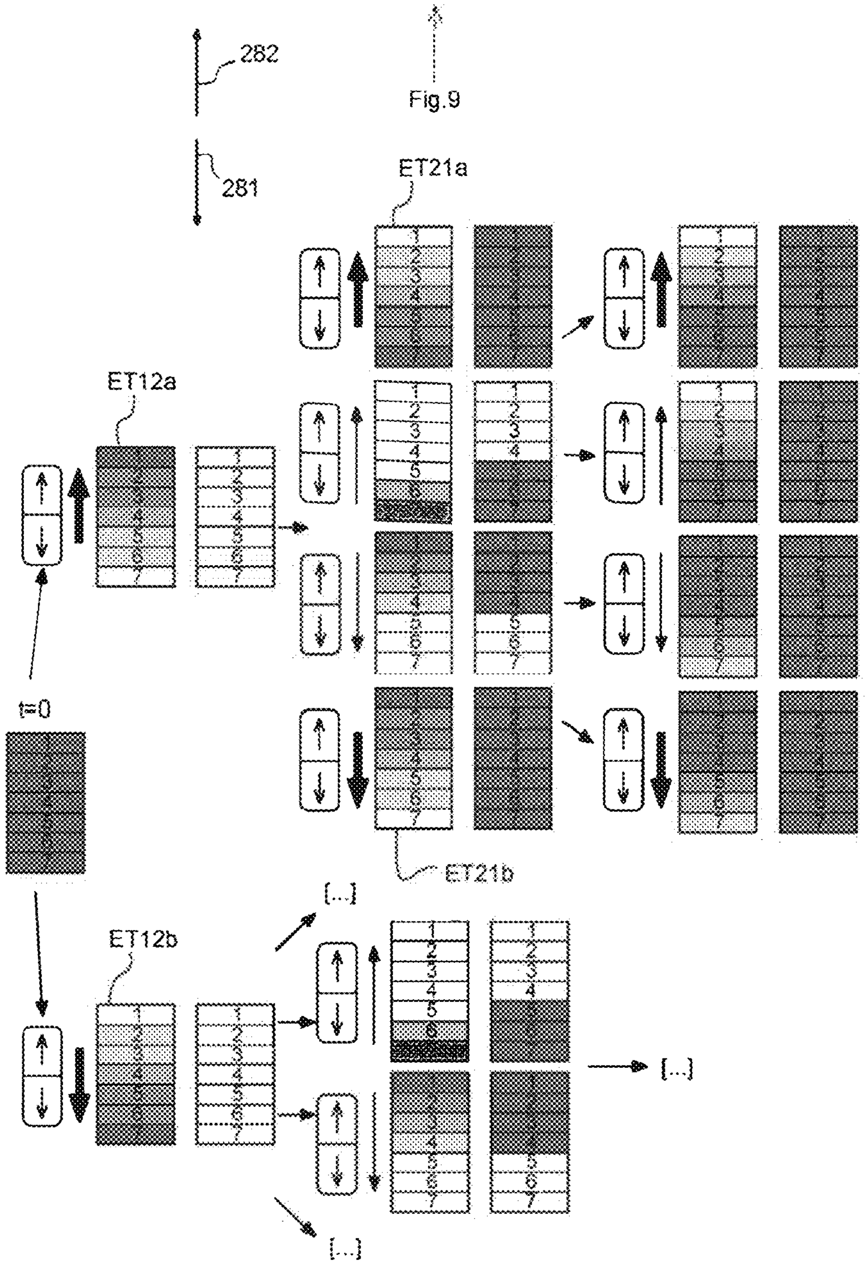

Fig.11 continuation

Fig. 11 continuation
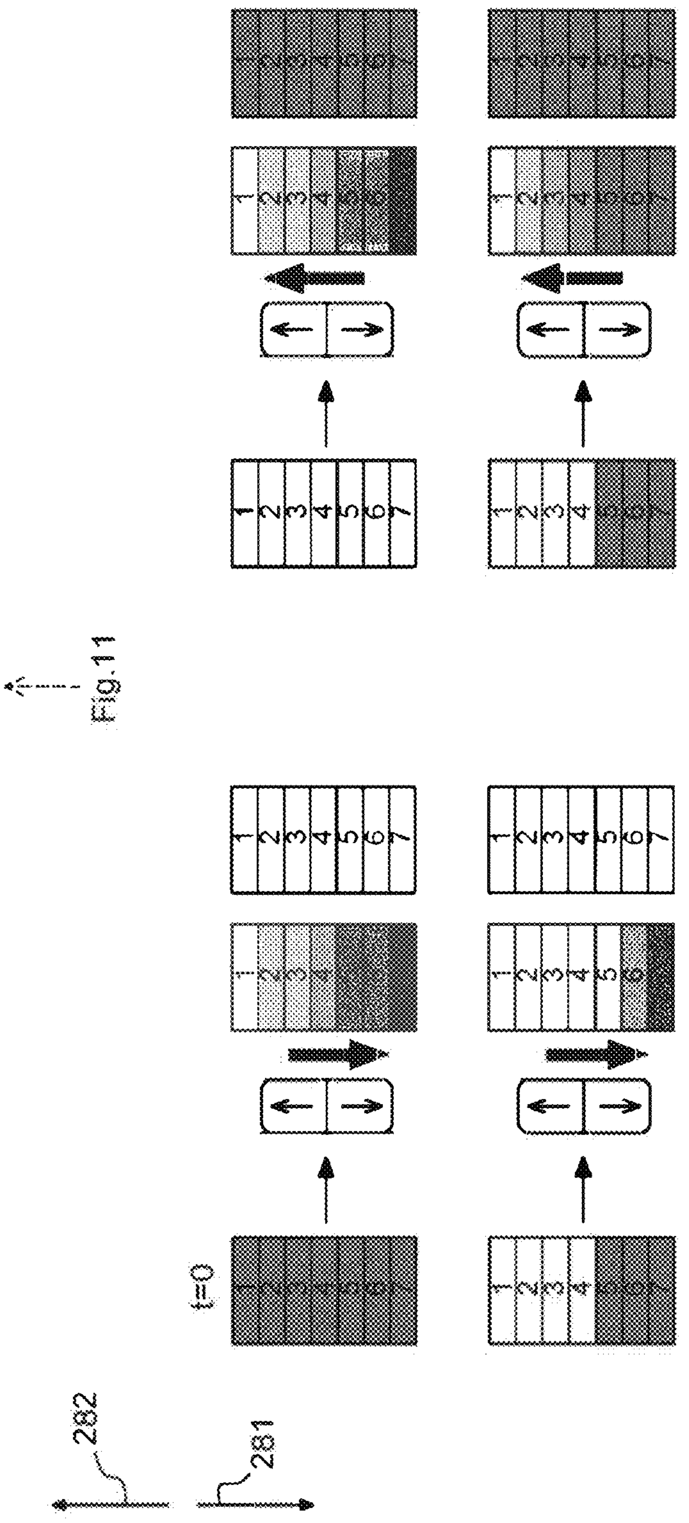

METHOD FOR CONTROLLING AN OPACIFYING GLAZING FOR A MOTOR VEHICLE

BACKGROUND

The invention relates to a method for controlling an opacifying glazing for a motor vehicle. The invention also relates to a device for controlling an opacifying glazing for a motor vehicle. The invention also relates to a computer program implementing the aforementioned method. Lastly, the invention relates to a recording medium on which such a program is recorded.

Motor vehicles equipped with a fixed glass roof or an openable roof are generally provided with a screening means which may be a flexible or rigid blind which opens mechanically or electrically. This screening means is essential for the visual and thermal comfort of users of the motor vehicle. However, it appreciably increases the weight of the vehicle and reduces its habitability.

In order to reduce the weight and volume of the screening means, one solution consists in replacing this type of screening means with solutions using an opacifying glazing. The use of an opacifying glazing also offers multiple possibilities for opacifying the passenger compartment.

However, this solution has drawbacks. To be specific, for a user, the use of an opacifying glazing is less intuitive than the use of a physical screen. In particular, the user may find it difficult to get used to the new possibilities offered by the opacifying glazing and the controls that allow them to change the opacity of the glazing according to their needs.

BRIEF SUMMARY

The aim of the invention is to provide a device and a method for controlling opacifying glazing which overcomes the above drawbacks and improves the devices and methods for controlling opacifying glazing known from the prior art. In particular, the invention makes it possible to produce a device and a method which are simple and reliable and which allow intuitive and multidirectional control of an opacifying glazing.

To this end, the invention relates to a method for controlling an opacifying glazing for a motor vehicle, at least part of the glazing comprising a plurality of zones, the level of opacity of each zone being controlled individually to vary between a minimum value and a maximum value, the plurality of zones being arranged with sequence numbers i increasing in a first direction.

The method includes the following steps:

- increasing the opacity of the glazing comprising increases in the level of opacity of each zone according to increasing functions of time, the increases being initialized zone after zone according to their increasing or decreasing sequence numbers i with a time lag between each zone, and/or
- reducing the opacity of the glazing comprising reductions in the level of opacity of each zone according to decreasing functions of time, the reductions being initialized zone after zone according to their increasing or decreasing sequence numbers i with a time lag between each zone.

The method may comprise, prior to the steps of increasing the opacity of the glazing and reducing the opacity of the glazing, a step of detecting a command to change the opacity of the glazing.

The step of detecting a command may include a sub-step of determining a control orientation either in the first direction or in a second direction, opposite to the first direction,

- and the steps of increasing and reducing may initiate, zone by zone, increases and reductions in opacity, respectively.
  - according to the increasing sequence numbers i of the zones if the direction of control is determined in the first direction, or
  - according to the decreasing sequence numbers i of the zones if the direction of control is determined in the second direction.

The sub-step of determining a control orientation may include:

- detecting a direction of control indicated by a location of pressing, and/or
- a direction of pressing on a control button.

The increasing or decreasing functions of time of the opacity of the zones may be linear or non-linear and/or the increasing or decreasing functions of time of the opacity of the zones may be different depending on the zone in question.

The method may include a step of automatic control of the glazing using data from a set of sensors.

The invention further relates to a method for controlling an opacifying glazing for a motor vehicle, in which:

- a first type of order, such as a short press on a control button, causes a phase of implementation of the control method as claimed in one of the preceding claims applied to a part of the glazing, and/or
- a second type of order, such as a long press on a control button, causes a phase of implementation of the control method as claimed in one of the preceding claims applied to the whole of the glazing.

The invention also relates to an opacifying glazing device, the device comprising hardware and/or software elements implementing a method as defined above.

The invention further relates to a vehicle comprising a glazing device as defined above.

The invention also relates to a computer program product comprising program code instructions recorded on a computer readable medium for implementing the steps of a method as defined above when said program is operating on a computer or computer program product downloadable from a communications network and/or recorded on a data medium readable by a computer and/or executable by a computer, characterized in that it comprises instructions which, when the program is executed by the computer, cause it to implement the method as defined above.

The invention also relates to a data recording medium, readable by a computer, on which is recorded a computer program comprising program code instructions for implementing a method as defined above or a computer readable recording medium comprising instructions which, when executed by a computer, cause it to implement the method as defined above.

The invention also relates to a signal from a data medium, carrying the computer program product defined above.

BRIEF DESCRIPTION OF THE DRAWINGS

The attached drawing depicts, by way of example, an embodiment of a glazing device according to the invention and a mode of implementation of a control method according to the invention.

DETAILED DESCRIPTION

Figure 1:
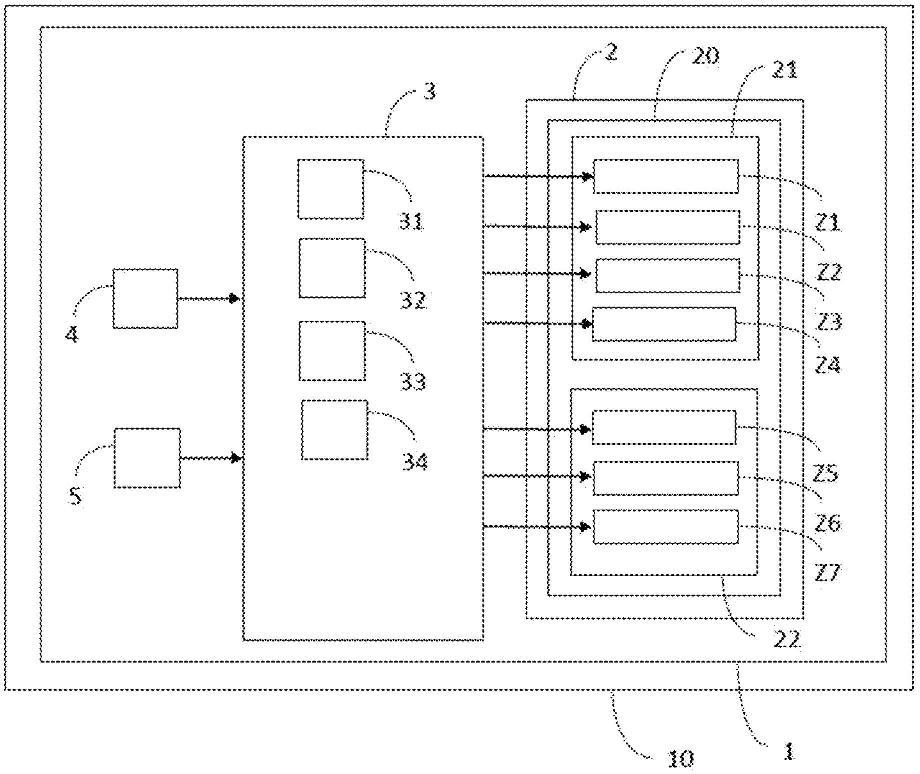
FIG. 1 depicts a motor vehicle equipped with a glazing device.
Figure 2:
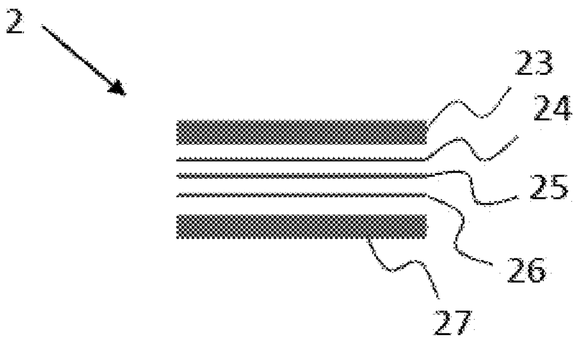
FIG. 2 depicts a sectional view of an embodiment of an opacifying glazing.

An example of a motor vehicle 10 equipped with an embodiment of a glazing device 1 with an opacifying glazing is described below with reference to FIG. 1.

The motor vehicle 10 may be a vehicle of any type, in particular a passenger vehicle or a utility vehicle.

The glazing device 1 mainly comprises the following elements:

- an opacifying glazing 2,
- a microprocessor or computer 3,
- a control interface 4,
- a set of sensors 5.

An embodiment of an opacifying glazing 2 is illustrated in FIGS. 2 to 5.

The opacifying glazing 2 allows variable opacity to be implemented in the glazing. The opacity of the glazing may be characterized by different physical quantities, in particular a percentage transmission of light rays. The opacity may vary between at least two values, a minimum value OPMIN corresponding to a state referred to as the "light state" or "transparent state" of the glazing, and a maximum value OPMAX corresponding to a state referred to as the "dark state" of the glazing. Various technologies also make it possible to implement intermediate opacification states. This is particularly the case of PDLC ("Polymer Dispersed Liquid Crystal") technology, preferentially described in this document.

Figure 3:
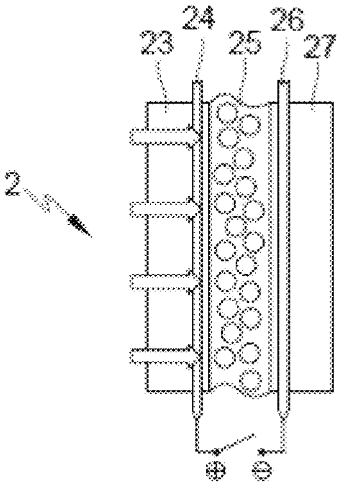
FIG. 3 depicts an operating principle of an opacifying glazing.
Figure 4:
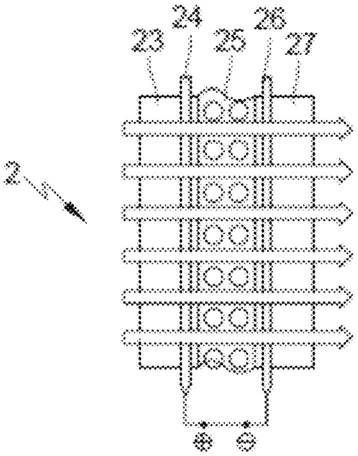
FIG. 4 depicts an operating principle of an opacifying glazing.

In this embodiment shown in FIGS. 3 and 4, the opacifying glazing 2 comprises an opacifying film 25, in particular a PDLC film, laminated between two layers of glass 23, 27. A PDLC film consists of liquid crystals embedded in a polymer resin.

A first and a second conductive layer 24, 26 are arranged between the opacifying film 25 and each of the glass layers 23, 27, respectively.

As shown in FIGS. 3 and 4, the change in opacity of the glazing is controlled by applying, or not applying, an electrical voltage between the first and the second conductive layer 24, 26.

In FIG. 3, with no voltage applied between the two conductive layers 24, 26, the liquid crystals are arranged randomly in the polymer resin and block the transmission of light.

In FIG. 4, the application of a voltage between the two conductive layers 24, 26 causes an orientation of the liquid crystals in the polymer resin, which allows the transmission of light through the PDLC film.

In the rest of the document, the expression "opacity change command" is used to designate the application of a voltage between the two conductive layers 24, 26 of the opacifying glazing, and the voltage applied may be zero or non-zero.

A glazing 2 according to the invention comprises a plurality of zones Z1, Z2, Z3, Z4, Z5, Z6, Z7, the level of opacity of each zone being controlled individually to vary between a minimum value OPMIN and a maximum value OPMAX. The number n of zones of the glazing is greater than or equal to two.

Figure 5:
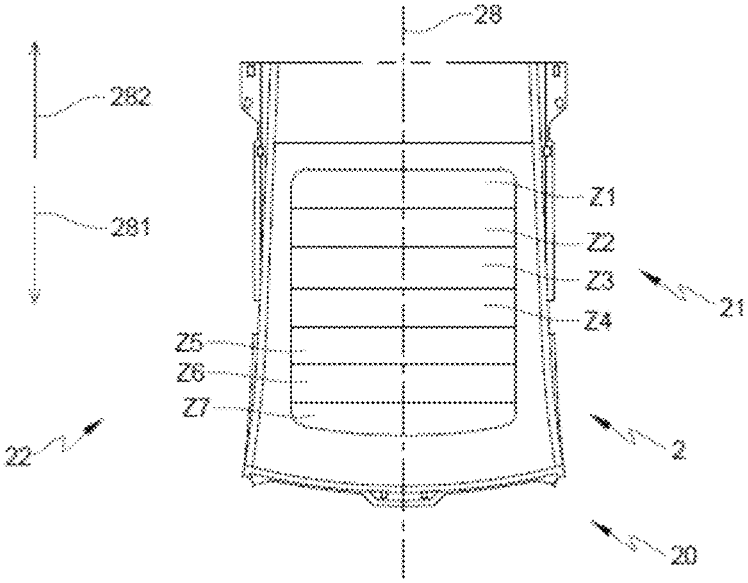
FIG. 5 depicts a top view of an embodiment of an opacifying glazing composed of a plurality of zones and fitted on a vehicle.

In the embodiment shown more specifically in FIG. 5, the glazing 2 is a motor vehicle roof glazing. In the embodiment presented, the opacifying film was cut, specifically into seven separate segments, before being shaped between two sheets of glass. The glazing 2 thus has seven zones Z1, Z2, Z3, Z4, Z5, Z6, Z7, respectively associated with the seven segments of opacifying film. Cutting the opacifying film into seven separate segments thus makes it possible to independently control the level of opacification of each of the seven zones defined.

The role of the glazing device 1 is to implement coordination of the commands for a set of zones of an opacifying glazing which allows:

- multidirectional opacification of the glazing 2, in other words a multidirectional increase in the opacity of the glazing, and
- multidirectional de-opacification of the glazing 2, in other words a multidirectional reduction in the opacity of the glazing.

Multidirectional opacification and de-opacification correspond to an implementation of opacity in several directions. They are the opposite to unidirectional opacification and de-opacification, as achieved in particular by a physical screen, which allows opacification of the roof glazing in a single direction, generally from the rear to the front of the vehicle, and de-opacification of the roof glazing in a single direction, opposite to the direction of opacification. Multidirectional opacification allows an increase or reduction in opacity of the glazing which may both be carried out in at least two directions, for example from rear to front and from front to rear of the vehicle.

In the embodiment presented, the zones Z1, Z2, Z3, Z4, Z5, Z6, Z7 defined correspond to a segmentation of the glazing into strips, the strips being arranged along a line 28, referred to in the rest of the document as the "control line" 28. In this embodiment, the control line 28 is a substantially straight line parallel to the longitudinal axis of the motor vehicle 10.

Two directions of the control line 28 are defined,

- a first direction 281, connecting, in the case illustrated, the front of the motor vehicle 10 to the rear of the motor vehicle 10,
- a second direction 282 opposite to the first direction 281.

In the embodiment described, the zones Z1, Z2, Z3, Z4, Z5, Z6, Z7 are numbered in increasing order or have a sequence number i increasing in the first direction 281.

The direction 281, 282 of the control line defines the order in which a plurality of zones are commanded to change their opacity. For example, in the event of a command to change the opacity of zones Z1, Z2, Z3, Z4, if the control line is oriented in direction 281, zone Z1 will be commanded to change its opacity first, then zone Z2 will be commanded second, zone Z3 will be commanded third, and zone Z4 will be commanded fourth. If the control line is oriented in direction 282, then zone Z4 will be commanded to change its opacity first, then zone Z3 will be commanded second, then zone Z2 will be commanded third and zone Z1 will be commanded fourth.

In alternative embodiments, the glazing 1 could be cut into fewer zones, for example into three zones. Alternatively, the glazing 1 could be cut into a number of zones greater than seven, for example into ten zones.

The zones could also have different widths and the distance, along the control line 28, between two adjacent strips could be variable.

The zones could take various shapes, in particular they could be delimited from one another by lines of various shapes, for example curved lines.

Depending on the spatial arrangement of the zones, the control line 28 could also be a curve.

In the embodiment described, as the zones Z1, Z2, Z3, Z4, Z5, Z6, Z7 are defined by the structure of the glazing 2 itself, the number of zones of the glazing is fixed.

However, the glazing device makes it possible to group together the zones Z1, Z2, Z3, Z4, Z5, Z6, Z7 into a set of partitions 20 containing at least one partition 21, 22.

A partition is made up of a subset of zones, preferably arranged in continuity along the control line. In other configurations, the zones could also be distributed alternately between at least two partitions, for example the odd numbered zones could be contained in a first partition 21 and the even numbered zones could be contained in a second partition 22, so as to be able to opacify the glazing in spaced strips.

The function of the partitions is to configure, on the basis of the glazing zones Z1, Z2, Z3, Z4, Z5, Z6, Z7, various opacity configurations of the glazing. These configurations are referred to as "stable states of the glazing" or "stable states" in the rest of the document.

The glazing 2, in particular each zone of the glazing, may be either in a stable state or in a transient state.

A stable state of the glazing is characterized by the fact that the opacity of the glazing zones is homogeneous over each of the partitions. In other words, when the glazing is in a stable state, the zones of a given partition all have the same opacity, for each partition 21, 22 of the glazing 2.

A transient state of the glazing corresponds to one of the states taken by the glazing during its transition between two stable states. When the glazing is in a transient state, at least two zones of a partition of the glazing have different levels of opacity.

Figure 6:
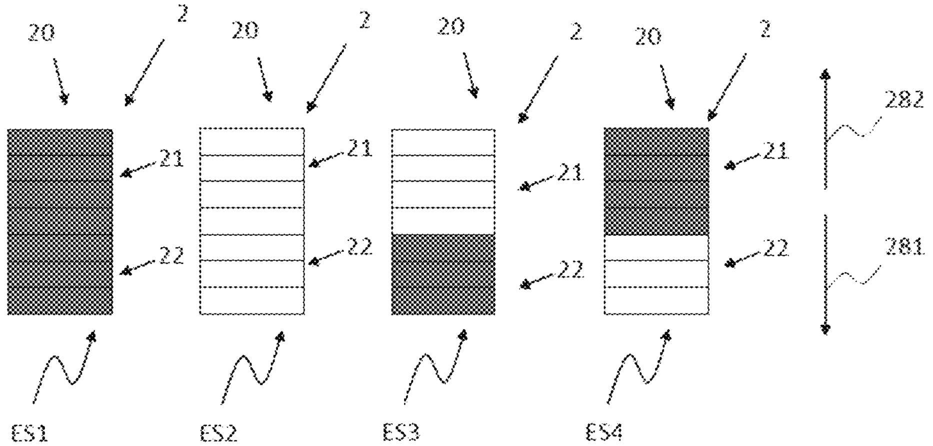
FIG. 6 schematically depicts an embodiment of partitions and stable states of the opacifying glazing.

An embodiment of the partitions of a glazing and the associated stable states is illustrated in FIG. 6. In this embodiment, the zones and the partitions are defined in such a way as to allow differentiated opacification between the front and rear of the vehicle:

- partition 21 groups together zones Z1, Z2, Z3 and Z4 located in the front part of the glazing,
- partition 22 groups together zones Z5, Z6 and Z7 located in the rear part of the glazing.

In the embodiment illustrated in FIG. 6, a set of possible stable states implementing the partitions 21, 22 is defined as a function of two levels of stable opacity, a minimum level OPMIN and a maximum level OPMAX.

The partitions 21 and 22 combined with the two levels of opacity OPMIN and OPMAX make it possible to implement four stable states of the glazing ES1, ES2, ES3, ES4:

- the first stable state ES1 corresponds to the application of the maximum level of opacity OPMAX to the two partitions 21, 22,
- the second stable state ES2 corresponds to the application of the minimum level of opacity OPMIN to the two partitions 21, 22,
- the third stable state ES3 corresponds to the application of the minimum level of opacity OPMIN to partition 21, and the application of the maximum level of opacity OPMAX to partition 22,
- the fourth stable state ES4 corresponds to the application of the maximum level of opacity OPMAX to partition 21, and the application of the minimum level of opacity OPMIN to partition 22.

Alternatively, other sets of stable states of the glazing comprising zones Z1 to Z7 could be defined by varying at least one of the following parameters:

- the number of partitions, which may range from 1 to 7, a number of partitions equal to 1 corresponding to a distribution of the seven zones in a single partition, a number of partitions equal to 7 corresponding to the distribution of one zone per partition,
- the distribution of zones Z1 to Z7 between at least one and at most seven partitions, and
- the number of stable levels of opacity, which is greater than or equal to two.

Advantageously, the partitions 21, 22 are defined in such a way as to allow differentiated opacification between the front and the rear of the vehicle. Alternatively, other embodiments of the zones and partitions could allow differentiated opacification between the right-hand part and the left-hand part of the vehicle.

The glazing device 1 further comprises a control interface 4 which allows a vehicle user to select the stable state of the glazing ES1, ES2, ES3, ES4 that they wish to use in the motor vehicle 10.

Figure 7:
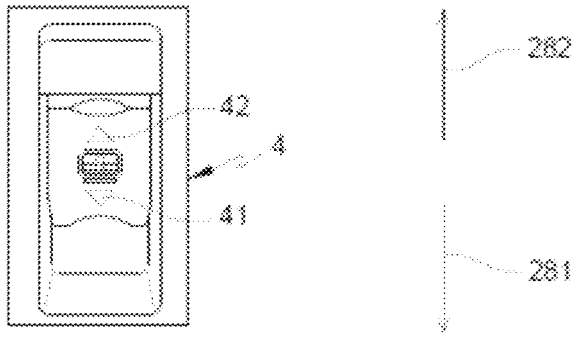
FIG. 7 depicts an embodiment of a control interface.

In a first embodiment, the control interface 4 may be produced in the form of a button, in particular a directional push button 4 shown in FIG. 7. The directional push button allows a user to control a change in opacity via two parameters: the chosen direction, and the duration of pressing.

In the first embodiment of the control interface, the choice of direction is made by pressing on a first location 41 on the button pointing toward the rear of the vehicle, and on a second location 42 on the button pointing toward the front of the vehicle. In other words, the button makes it possible to select one or the other of the first and second directions 281, 282.

In addition, the directional push button makes it possible to measure a duration of pressing DAPP. This measurement thus makes it possible to categorize pressing by comparing the duration of pressing to a threshold APPMIN. Thus, pressing for a duration strictly less than the threshold APPMIN will be considered a "short press", and pressing for a duration greater than or equal to the threshold APPMIN will be considered a "long press". Categorizing pressing according to the duration of pressing makes it possible to apply differentiated processing according to the category of pressing.

Figure 13:
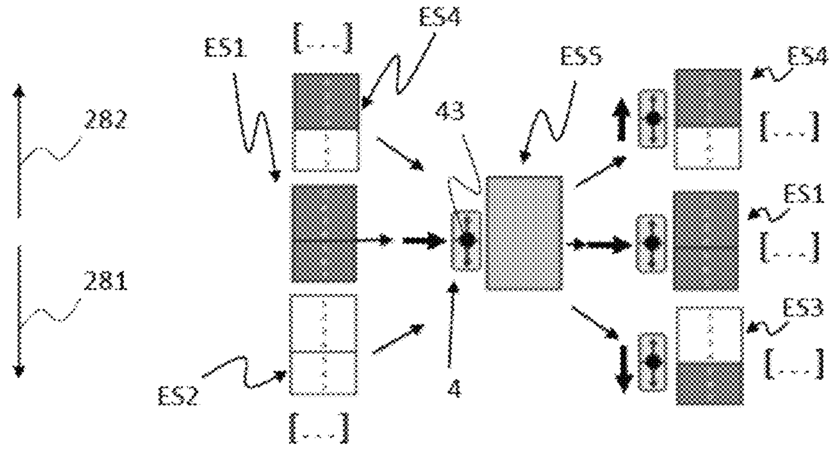
FIG. 13 illustrates a third operating logic of the opacifying glazing.

Optionally, the directional push button 4 may include a third location 43, shown more specifically in FIG. 13. The third location 43 is preferably situated between the first and second locations 41, 42. The third location 43 allows the activation of an automatic glazing control mode described later in the document. In one embodiment, a long press on location 43 could deactivate automatic control mode. In addition or alternatively, deactivation of the automatic mode could be obtained by a long or short press on one of locations 41 or 42.

In a second embodiment, alternative or in addition to the first embodiment, the control interface 4 could take the form of a human machine interface, which could, for example, be provided by the multimedia screen of the vehicle or a mobile phone app.

The human machine interface could make it possible to control the glazing 2 according to the same parameters as a physical button of directional push button type, that is to say a control direction 281, 282 and a duration of pressing DAPP. Instead of commanding a duration of pressing in the strict sense, the user could select a type of press between two choices, a long press or a short press.

Alternatively, the human machine interface could make it possible to select a final stable state of the glazing from among all the possible stable states ES1, ES2, ES3, ES4, for example by clicking directly on a visual representation of the possible stable states for the glazing 2.

In addition or alternatively, the human machine interface could also include a voice command, making it possible in particular to activate and deactivate automatic glazing control.

The glazing device may also include a set of sensors 5. The set of sensors 5 provides data allowing the implementation of automatic control of the glazing 2. For example, the set of sensors 5 may include one or more sunshine sensors advantageously placed on the roof of the vehicle. The data from these sunshine sensors may make it possible to automatically determine which roof partitions should be opacified in order to protect the passenger compartment from the sun's rays.

In addition or alternatively, the set of sensors 5 may include one or more interior and exterior temperature sensors arranged on the motor vehicle 10. The temperature sensors may allow the implementation of automatic control of the opacifying glazing, for example to achieve and maintain a desired interior temperature.

In addition, exterior temperature sensors could make it possible to manage the influence of the exterior temperature on the operation of the opacifying roof. To be specific, very low temperatures significantly slow down the operation of the opacifying film, which considerably limits the possibilities for changing the opacity of the glazing. Advantageously, the glazing device 1 could be deactivated when the exterior temperature is below a temperature limit threshold, the limit threshold possibly being −20 degrees. The user would be informed of this deactivation linked to the exterior temperature.

The glazing device 1, and specifically the microprocessor, mainly comprises the following modules:

- a module 31 for detecting a command to change the opacity of the glazing, the module 31 being able to interact with the control interface 4,
- a module 32 for opacifying the glazing, the module being able to interact with the glazing 2,
- a module 33 for de-opacifying the glazing, the module being able to interact with the glazing 2, and
- a module 34 for automatically controlling the glazing, the module being able to interact with the glazing 2 and the set of sensors 5.

The motor vehicle 10, specifically the glazing device 1, preferably comprises all the hardware and/or software elements configured so as to implement the method defined in the subject matter of the invention or the method described below.

Figure 8:
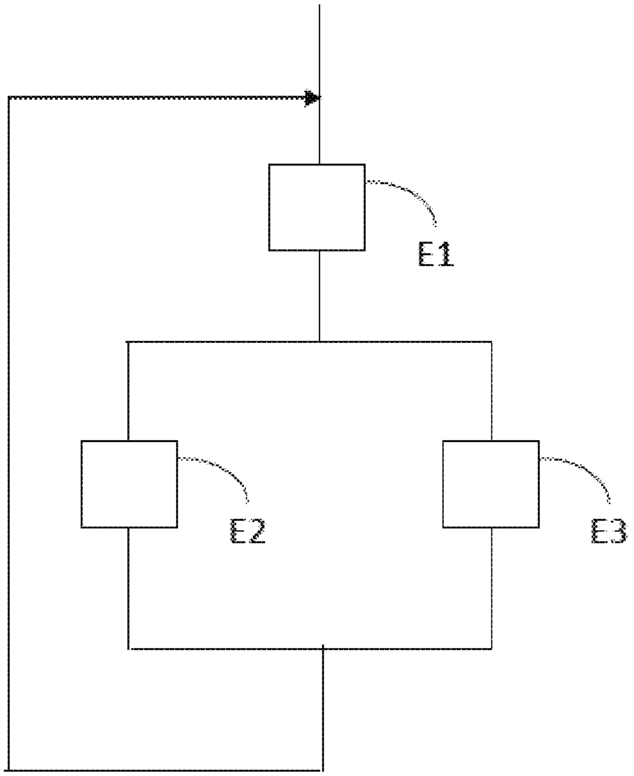
FIG. 8 depicts a flowchart of a first mode of implementation of a control method.

A first mode of implementation of the method for controlling an opacifying glazing is described below with reference to FIG. 8.

In a first step E1, a command to change the opacity of the glazing is detected at a time T.

In the first embodiment of the control interface 4, the detection of a command to change the opacity of the glazing is triggered by pressing on a control button 4, in particular on the locations 41, 42 on the control button.

The detection step E1 includes a sub-step of determining an orientation of the control:

- pressing on location 41 determines the control orientation as being the first direction 281,
- pressing on location 42 determines the control orientation as being the second direction 282.

Alternatively or in addition, the detection step E1 comprises a sub-step of determining an orientation of the control:

- pressing on a button in a third direction determines the control orientation as being the first direction 281,
- pressing on a button in a fourth direction determines the control orientation as being the second direction 282.

The detection step E1 further comprises determining the duration of pressing DAPP on the control button. By comparing the duration of pressing to a minimum duration of pressing threshold APPMIN, two categories of pressing are determined:

- pressing referred to as short presses, the duration of which is strictly less than the minimum duration of pressing threshold APPMIN, and
- pressing referred to as long presses, the duration of which is greater than or equal to the minimum duration of pressing threshold APPMIN.

Thus, as will be seen in the rest of the document, the duration of pressing DAPP is used to distinguish two types of orders:

- a first type of order, such as a "short" press on the control button, causes a phase of implementation of opacification or de-opacification commands applied to a part of the glazing, said part of the glazing corresponding, in the embodiment shown, to one or other of the partitions 21, 22, and/or
- a second type of order, such as a "long" press on the control button, causes a phase of implementation of opacification or de-opacification commands resulting in complete opacification or de-opacification of the glazing. Note that, following the second type of order, the opacification or de-opacification commands may be applied to a part or to the whole of the glazing, depending on the initial state of opacification of the glazing.

Step E1 further comprises a sub-step of determining an initial stable state ESI. The initial stable state ESI corresponds to the state of opacity of the glazing at time T when the opacity change command is issued. In the embodiment described, the initial stable state corresponds to one of the four stable states ES1, ES2, ES3 and ES4 described in FIG. 6.

The initial stable state is determined by the voltage applied to each zone of the glazing at time T, the zones of the same partition all being subjected to substantially the same voltage. Naturally, the control device could use technology other than voltage control to ensure a stable state of at least one partition.

Thus, by knowing the voltages applied to the zones, we determine the initial stable state ESI as being one of the stable states defined for the glazing 2, that is to say the state ES1, the state ES2, the state ES3 or the state ES4.

Next comes a sub-step of determining a final stable state ESF. Note that any new opacity change command issued by a user during the execution of the control method will only be taken into consideration when the glazing has reached the final stable state ESF.

In the embodiment described, the final stable state ESF of the glazing 2 may be determined as a function of the parameters previously defined in step E1, that is to say an initial stable state ESI, a control direction 281, 282 and a duration of pressing DAPP.

Figure 9:
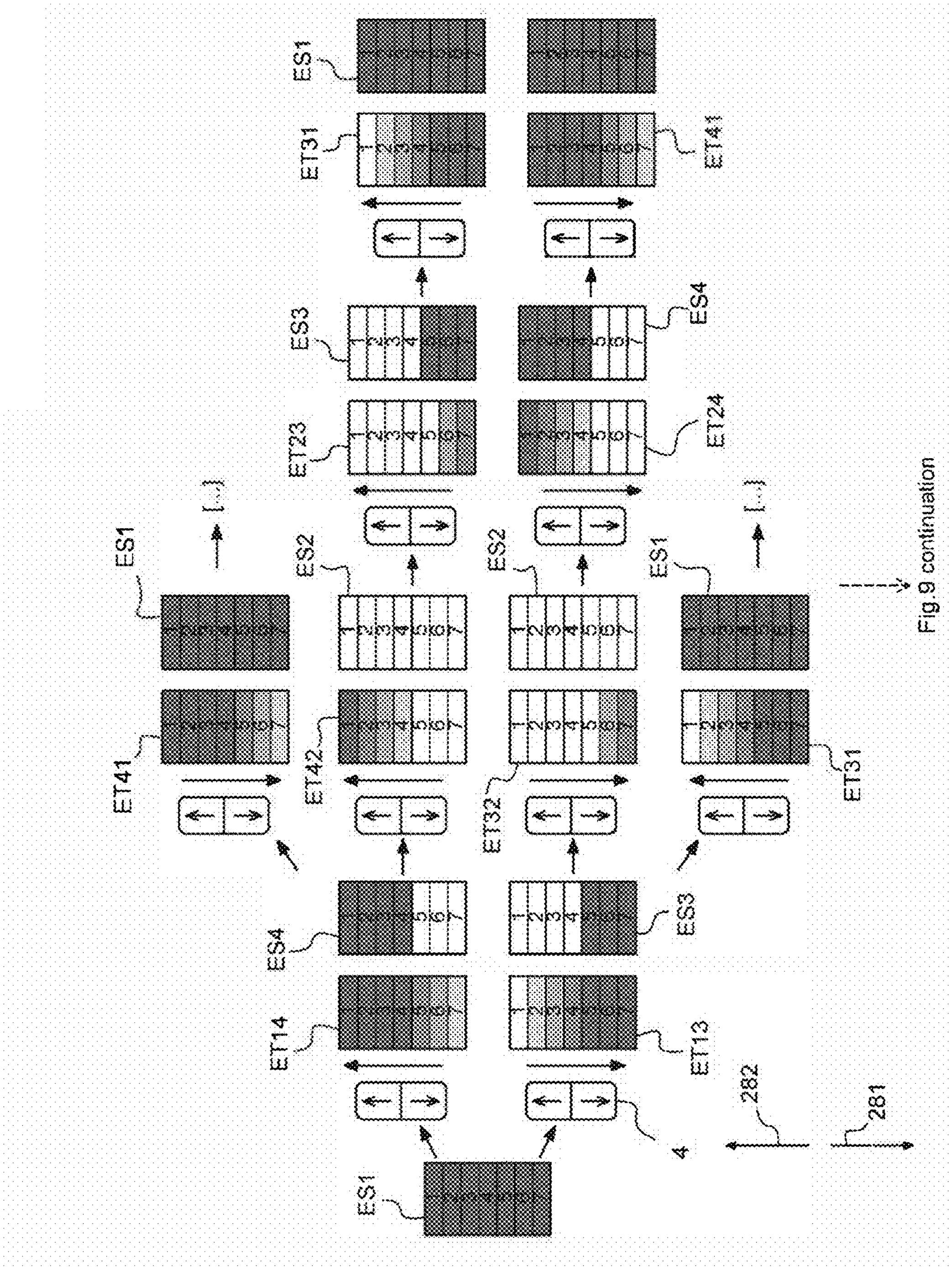
FIG. 9 illustrates a first operating logic of the opacifying glazing.

A first mode of determining the final stable state as a function of these parameters is described in FIG. 9.

A short press command is represented by a thin arrow oriented in one of the control directions 281, 282. A long press command is represented by a thick arrow oriented in one of the control directions 281, 282.

FIG. 9 depicts the possible transitions between two stable states of the glazing according to a first operating logic of the glazing. Each control sequence includes:

- an initial stable state ES1, ES2, ES3, ES4,
- a command consisting of a control direction 281, 282 and a duration of pressing DAPP
- a transition ET12a, ET12b, ET13, ET14, ET21a, ET21b, ET23, ET24, ET31, ET32, ET41, ET42, each transition consisting of a set of transient states between two stable states, and
- a final stable state ES1, ES2, ES3, ES4.

The first operating logic of the glazing described in FIG. 9 is transcribed in table 1, referred to in the rest of the document as the "first transition table".

first column of the first transition table contains the unique reference of each transition. The reference is defined by the letters "ET" followed by a first digit corresponding to the number of the initial stable state, and a second digit corresponding to the number of the final stable state. For example, the first row of the table describes a transition ET14 between the initial stable state ES1 and the final stable state ES4.

A reference may also contain an additional letter, as is the case for example of the references ET12a and ET12b appearing respectively in the third and fourth row of the table. Transitions ET12a and ET12b describe two possible transitions between the same initial stable state ES1 and the same final stable state ES2; however, the transitions ET12a and ET12b differ from one another by the control direction, which will result—in de-opacification step E3 for executing one or the other of these transitions—in a different order of de-opacification of the zones in question.

The second column of the first transition table contains the reference of the initial state ESI of each transition.

The third column of the first transition table contains the reference of the final state ESF of each transition.

The fourth column of the first transition table contains the category of the duration of pressing DAPP of each transition, and this category may be a short press or a long press. For certain transitions, such as the transition ET31, the category of pressing does not matter. In other words, whatever the duration of pressing, the glazing will go from the initial stable state ES3 to the final stable state ES1 by pressing in the second control direction 282, the transition taking place via an increase in opacity of zones Z4 to Z1, the sequencing of the opacification commands being carried out in descending order of numbering of the zones.

The fifth column of the first transition table contains the control direction, which may be either the first direction 281 or the second direction 282.

The sixth column of the first transition table contains the reference of the at least one partition 21, 22 the opacity of which is changed during each transition.

The seventh column of the first transition table contains the sense of variation (increase, reduction) of the opacity of the at least one partition designated in the sixth column.

TABLE 1

| ET | ESI | ESF | DAPP | direction | Partition | Variation of opacity | Order of change |
|---|---|---|---|---|---|---|---|
| ET14 | ES1 | ES4 | short | 282 | 22 | reduction | Z7, Z6, Z5 |
| ET13 | ES1 | ES3 | short | 281 | 21 | reduction | Z1, Z2, Z3, Z4 |
| ET12a | ES1 | ES2 | long | 282 | 21, 22 | reduction | Z7, Z6, Z5, Z4, Z3, Z2, Z1 |
| ET12b | ES1 | ES2 | long | 281 | 21, 22 | reduction | Z1, Z2, Z3, Z4, Z5, Z6, Z7 |
| ET23 | ES2 | S3 | short | 282 | 22 | increase | Z7, Z6, Z5 |
| ET24 | ES2 | ES4 | short | 281 | 21 | increase | Z1, Z2, Z3, Z4 |
| ET21a | ES2 | ES1 | long | 282 | 21, 22 | increase | Z7, Z6, Z5, Z4, Z3, Z2, Z1 |
| ET21b | ES2 | ES1 | long | 281 | 21, 22 | increase | Z1, Z2, Z3, Z4, Z5, Z6, Z7 |
| ET31 | ES3 | ES1 | short/long | 282 | 21 | increase | Z4, Z3, Z2, Z1 |
| ET32 | ES3 | ES2 | short/long | 281 | 22 | reduction | Z5, Z6, Z7 |
| ET42 | ES4 | ES2 | short/long | 282 | 21 | reduction | Z4, Z3, Z2, Z1 |
| ET41 | ES4 | ES1 | short/long | 281 | 22 | increase | Z5, Z6, Z7 |

The first transition table translates the chosen operating logic into a set of possible transitions between two states, each row of the table representing a transition. A unique reference is associated with each possible transition. The The eighth column of the first transition table contains the order in which the zones of the at least one partition designated in the sixth column are commanded to change their opacity.

Note that the first transition table implements a multidirectional movement of the change in opacity. In other words, the glazing 1 may become opaque in the first or second directions, and become clear in the first or second directions.

The parameters defined in the above sub-steps of step E1, that is an initial stable state ESI, a control direction 281, 282 and a duration of pressing DAPP, make it possible to select a single row of the table.

Thus, using the first transition table, a single transition ET12a, ET12b, ET13, ET14, ET21a, ET21b, ET23, ET24, ET31, ET32, ET41, ET42 is determined, thus determining the other parameters of the transition, that is to say the final stable state, the at least one partition the opacity of which is modified, referred to in the rest of the document as "the at least one selected partition", the sense of variation of the opacity, and the order in which the zones of the at least one partition designated in the sixth column are commanded to change their opacity.

According to the determination of these parameters, the next step will be either a step E2 of opacification of the at least one selected partition 21, 22, if the sense of variation of the opacity determined by the transition is an increase in the opacity, or a step E3 of de-opacification of the at least one selected partition 21, 22, if the sense of variation of the opacity determined by the transition is a reduction in the opacity.

The opacification step E2 comprises a sub-step E21 of determining an individual opacification command for each zone of the at least one selected partition 21, 22.

In the rest of the document, the zones of the at least one selected partition 21, 22 are referred to as "selected zones".

In sub-step E21, an individual opacity change command is determined for each selected zone.

The individual opacification command is defined to command the change in the opacity of a zone over time, between an initial value OPMIN and a final value OPMAX, the final value being greater than the initial value.

The opacity of a glazing zone increases when the voltage V applied between the first and second conductive layers 24, 26 of this zone decreases.

Therefore, an individual opacification command is defined to command a decreasing change in voltage V over time, between an initial value VMAX and a final value VMIN less than VMAX, the voltage V being applied between the first and second conductive layers 24, 26 of this zone.

In the rest of the document, the term "zone voltage variation function" is used to designate the change in voltage over time commanded between the first and second conductive layers 24, 26 of this zone.

The zone voltage variation function may be linear or non-linear. In particular, the zone voltage variation function may be defined in such a way as to achieve a progressive fading of the opacity of the zone or a progressive enhancement of the opacity of the zone.

In one embodiment, the voltage variation function may be different depending on the zone, for example to create an animation effect in conjunction with the sequencing of the individual opacity change commands described below.

The opacification step E2 includes a sub-step E22 of sequencing of the individual opacification commands for the selected zones.

The order of sequencing is defined by the orientation of the control line, in the first or second direction 281, 282. Thus, sub-step E22 initiates, zone by zone, increases in opacity according to the increasing sequence numbers i of the zones Zi if the control direction is determined in the first direction 281, or according to the decreasing sequence numbers i of the zones Zi if the control direction is determined in the second direction 282.

The individual commands determined in step E21 are therefore applied in an increasing or decreasing order of numbering of the selected zones. Advantageously, a time delay separates the application of two successive individual commands, for example a delay of 500 milliseconds. The time delay may be constant over all the intervals separating two successive commands. Alternatively, the time delay may vary depending on the interval, in order to create an animation. For example, the time delay may decrease over the successive application of commands, which creates an effect of accelerating the change in opacity in the control direction.

Figure 10:
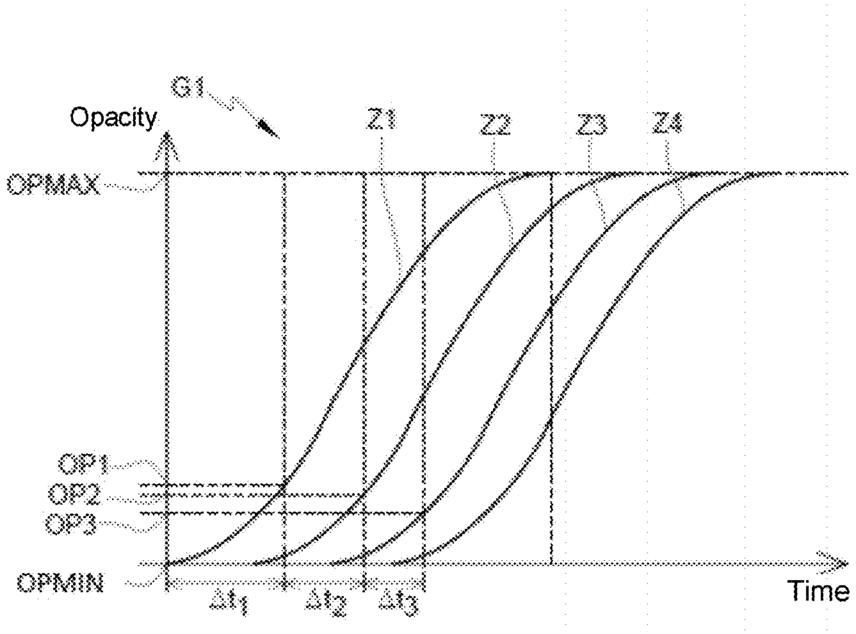
FIG. 10 illustrates a sequencing of individual opacification commands for a plurality of zones of the opacifying glazing.

FIG. 10 illustrates a mode of implementation of the sequencing of individual opacification commands for zones Z1 to Z4 of partition 21. Graph G1 depicts the change in opacity over time of each of the zones Z1 to Z4 by a non-linear increasing function of time.

The profile of variation of opacity over time is approximately the same from one zone to another, which means that each zone becomes opaque according to the same cycle.

The profile may be of evolutionary variation type:

starting at a minimum opacity value OPMIN with a slight acceleration in opacity at the start of the cycle until a given opacification speed is reached, maintaining the given opacification speed until an opacity close to the maximum opacity value OPMAX is reached, then a slowdown in opacification at the end of the cycle.

According to a variant, the profile may be of linear type between the minimum OPMIN and maximum OPMAX opacity values.

Conversely, the time delays between two successive individual opacification commands vary, specifically decreasing as a function of time:

the first individual opacification command for zone Z1 is ordered at time T=0, a first delay Δt1 is applied between the first individual opacification command for zone Z1 and the second individual opacification command for zone Z2, a second delay Δt2, less than the first delay Δt1, is applied between the second individual opacification command for zone Z2 and the third individual opacification command for zone Z3, and a third delay Δt3, less than the second delay Δt2, is applied between the third individual opacification command for zone Z3 and the fourth individual opacification command for zone Z4.

For this reason, the opacification of the second zone Z2 starts when the first zone Z1 reaches a first level of opacity OP1, then the opacification of the third zone Z3 starts when the second zone Z2 reaches a second level of opacity OP2, lower than the first level of opacity OP1, then the opacification of the fourth zone Z4 starts when the third zone Z3 reaches a third level of opacity OP3, lower than the second level of opacity OP2.

Thus, graph G1 illustrates a mode of implementation of the method which implements a gradual acceleration in the speed of opacification of the glazing, while each zone changes individually following the same opacification curve.

Alternatively, when step E1 has detected a command to reduce the opacity, this is followed by a de-opacification step E3.

The de-opacification step E3 is carried out according to the same principle as the opacification step E2. In other words, step E3 includes

- a sub-step E31 of determining an individual de-opacification command for each selected zone, and
- a sub-step E32 of sequencing the individual de-opacification commands for the selected zones.

In sub-step E31, an individual de-opacification command is determined for each selected zone.

The individual de-opacification command is defined to command the change in opacity over time of a zone between an initial value OPMAX and a final value OPMIN, the final value being less than the initial value. As the opacity varies in the opposite direction to the voltage applied between the first and second conductive layers 24, 26 of this zone, an individual de-opacification command is therefore defined to command an increasing change in voltage V over time between an initial value VMIN and a final value VMAX greater than VMIN.

Sub-step E32 of sequencing the individual de-opacification commands for the selected zones operates according to the same principle as sub-step E22 described above for opacification. The order of sequencing is defined by the orientation of the control line, in the first or second direction 281, 282. Thus, sub-step E32 initiates, zone by zone, the reduction in opacity

- according to the increasing sequence numbers i of the zones Zi if the control direction is determined in the first direction 281, or
- according to the decreasing sequence numbers i of the zones Zi if the control direction is determined in the second direction 282.

The description of the sequencing implemented in sub-step E32 is similar to the description of the sequencing implemented in sub-step E22.

Different variants of the first mode of implementation may be considered.

Figure 11:
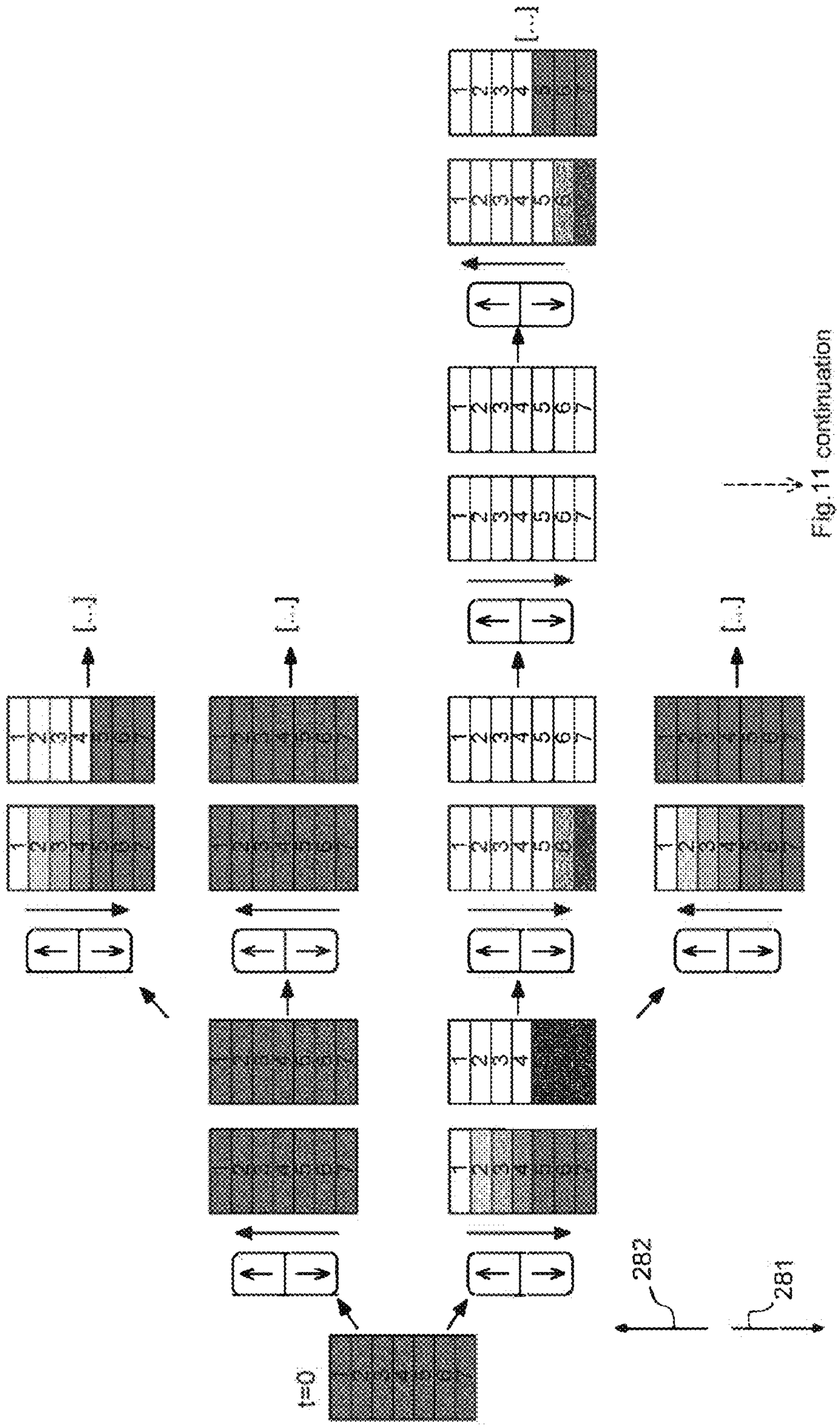
FIG. 11 illustrates a second operating logic of the opacifying glazing.

A first variant consists in using a transition table different from the first transition table, for example a second transition table described in table 2, describing the transitions illustrated by FIG. 11.

FIG. 11 depicts the possible transitions between two stable states of the glazing according to a second operating logic of the glazing.

| ET | ESI | ESF | DAPP | direction | Partition | Variation of opacity | Order of change |
|---|---|---|---|---|---|---|---|
| ET11 | ES1 | ES1 | short/short | 282 | — | — | — |
| ET13 | ES1 | ES3 | Short | 281 | 21 | reduction | Z1, Z2, Z3, Z4 |
| ET12 | ES1 | ES2 | Long | 281 | 21, 22 | reduction | Z1, Z2, Z3, Z4, Z5, Z6, Z7 |
| ET23 | ES2 | ES3 | short | 282 | 22 | increase | Z7, Z6, Z5 |
| ET22 | ES2 | ES2 | short/long | 281 | — | — | — |
| ET21 | ES2 | ES1 | long | 282 | 21, 22 | increase | Z7, Z6, Z5, Z4, Z3, Z2, Z1 |
| ET31 | ES3 | ES1 | short/long | 282 | 21 | increase | Z4, Z3, Z2, Z1 |
| ET32 | ES3 | ES2 | short/long | 281 | 22 | reduction | Z5, Z6, Z7 |

Note that the second transition table implements a unidirectional movement of the change in opacity. In other words, the glazing 1 may

- become clear only in the first direction 281, and
- become opaque only in the second direction 282.

Consequently, the operation described by the second transition table does not make it possible to reach the stable state ES4. In other words, in this mode of implementation, the partition 21 located at the front of the glazing may only be opacified if the partition 22 located at the rear of the glazing is opacified, and

- the partition 22 located at the rear of the glazing may only be cleared if the partition 21 located at the front of the glazing is cleared.

In an alternative embodiment of the control interface, a human machine interface could allow a user of the motor vehicle 10 to select or configure a transition table from a predefined set of partitions and possible stable states of the glazing comprising this predefined set of partitions.

The configuration by the user could also relate to the number of partitions of the glazing, the distribution of the zones of the glazing between the various partitions, the possible stable states of the glazing associated with these partitions, then the definition of a table of transitions between the possible stable states of the glazing.

The number of intermediate levels of opacity between the minimum level OPMIN and the maximum level OPMAX could also be configurable via a human machine interface. The different levels of opacity configured should then be taken into account in the definition of the possible stable states of the glazing, as well as a table of transitions between these stable states. Alternatively or in addition to one of the modes of implementation described above, other variant modes of implementation could include a step E4 of automatic glazing control.

Figure 12:
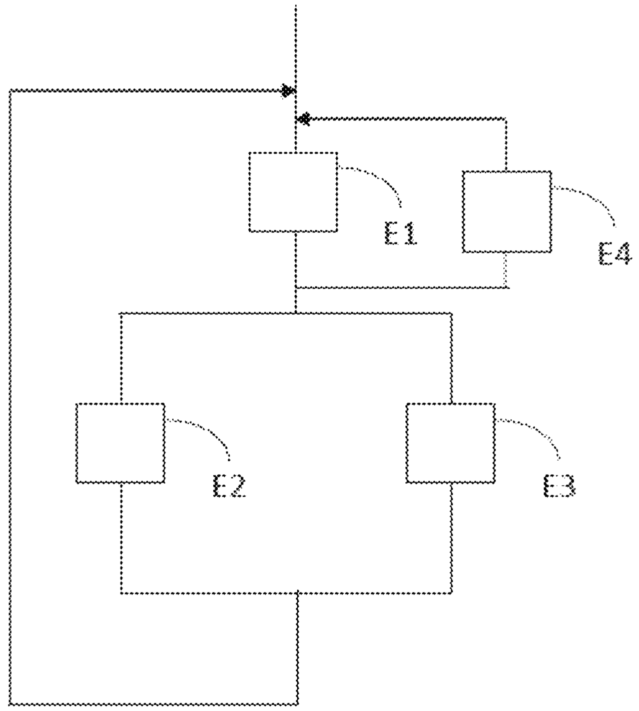
FIG. 12 depicts a flowchart of a second mode of implementation of the control method.

A mode of implementation of the control method comprising a step E4 of automatic glazing control is described in FIG. 12.

In this mode of implementation, step E1 includes, in addition to the processing described above for this step, detection of a command for activation of an automatic mode.

In one embodiment of the control interface 4 involving a multidirectional push button, the detection of a command for activation of an automatic mode may be carried out by detecting pressing on the third location 43 on the button.

Alternatively or in addition, the detection of a command for activation of an automatic mode may be carried out via a human machine interface or a voice command. The human machine interface or voice command may also make it possible to control a desired temperature in the passenger compartment, and the state of opacification of the roof may then contribute to reaching this temperature.

When a command for activation of the automatic mode is detected, the next step is a step E4 of automatic control of the opacifying glazing.

Step E4 includes determining a target level of opacity based on measurements from the set of sensors 5. The measurements may include one or more measurements of sunshine on the roof of the vehicle and/or a measurement of the exterior temperature. Advantageously, the measurements also include a measurement of the temperature in the passenger compartment of the motor vehicle 10.

Step E4 includes determining a target temperature, corresponding to the temperature desired by users in the passenger compartment. Depending on the type of control interface used, the target temperature may be determined by the user via a human machine interface and/or a voice command. Alternatively, the target temperature may be determined by a default value, for example 20 degrees, or by a predetermined difference with respect to the exterior temperature and/or the interior temperature, the predetermined difference possibly being a function of at least one of these temperatures.

On the basis of the target temperature defined, and the sunshine or temperature measurements, a target level of opacity of the glazing is determined allowing the temperature of the passenger compartment to evolve toward the target temperature.

In one mode of implementation of step E4, all the zones of the glazing are controlled simultaneously to implement the target level of opacity uniformly over all the zones of the glazing corresponding to the implementation of a fifth stable state ES5 shown in FIG. 13.

In an alternative embodiment, step E4 may include a selective change of one or more of the at least one partition 21, 22 of the glazing, in particular depending on the sunshine measurements making it possible to determine the direction of the light rays.

Step E4 includes updating the target level of opacity based on the update of the measurements from the set of sensors 5. The opacity of all or part of the at least one partition of the glazing is then modified according to the target level of opacity updated for each partition.

In one mode of implementation, when a change command is detected, in particular by pressing on one of the locations on the multidirectional push button, the next step is step E2 of detecting an opacity change command.

Overall, the invention makes it possible to control an opacifying glazing in a simple and intuitive manner.

The simple and intuitive nature arises first of all from the possible use of a directional push button, allowing a user to visually link the direction of pressing on the button and the direction of change in opacity.

In addition, the first mode of implementation of the method, defined by the first transition table, simulates the movement of a screen made up of a plurality of segments, in particular 7 segments.

Figure 14:
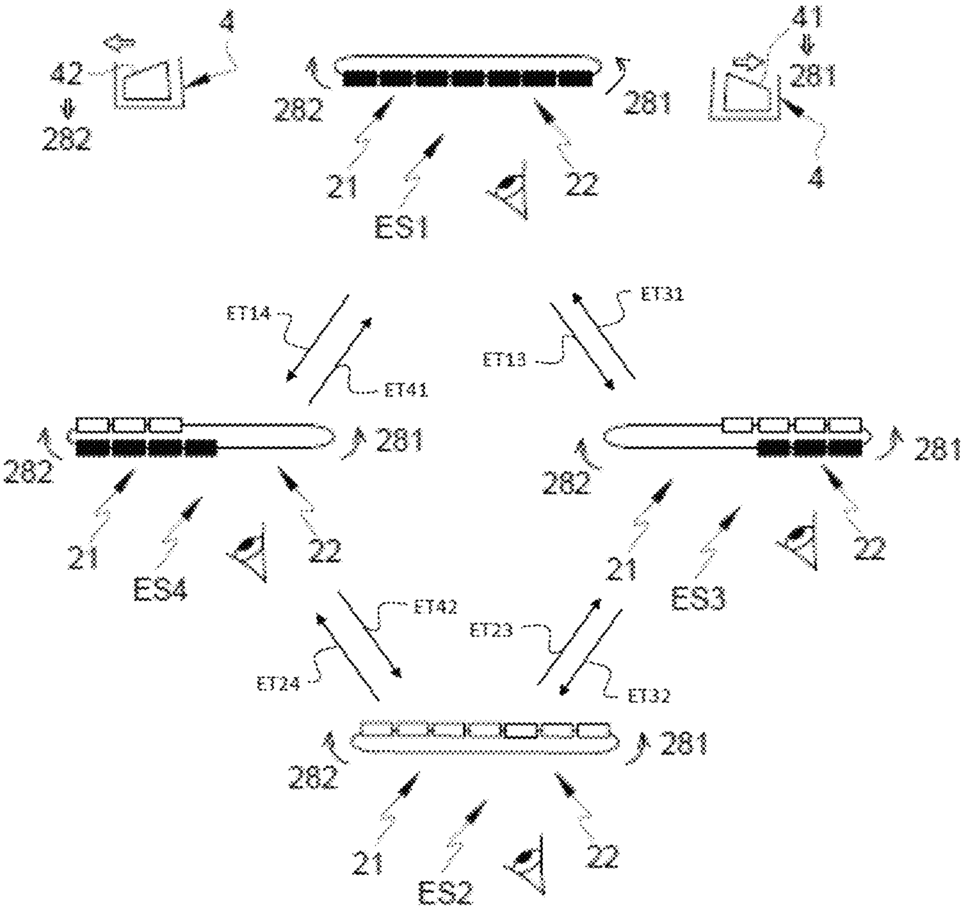
FIG. 14 schematically depicts the perception by a user of the animation implemented in the first mode of implementation of the control method.

FIG. 14 very schematically illustrates the perception by a user of the animation implemented in the first mode of implementation of the control method. A drawing of an eye has been positioned under each of the four stable states of the glazing shown, ES1, ES2, ES3, ES4, to represent a user's point of view on the glazing during the implementation of these stable states.

The solid rectangular segments correspond to the opacified glazing zones. For example, the stable state ES1 comprises 7 solid rectangular segments which represent the 7 opacified glazing zones.

The hollow rectangular segments are fictitious; they embody the mental representation of a fictitious hidden part of a screen. This perception of a hidden part of the screen is created by the animation which simulates a physical movement of the screen.

For example, the transition ET14 makes it possible to go from a completely opaque glazing to a glazing which is opaque only in partition 21, located at the front of the vehicle. The implementation of the transition ET14 is carried out by a successive reduction in the opacity of the zones in partition 22 in the control direction 282, thus creating the illusion that a screen is moving toward the front of the vehicle and that part of the screen is disappearing gradually into the roof of the vehicle, until the stable state ES4 is reached.

From the stable state ES4, if the user continues the change in opacity to obtain a glazing with minimum opacity, they implement transition ET42. This transition generates a successive reduction in the opacity of the zones in partition 21, creating the illusion that the screen is continuing its physical movement toward the front of the vehicle until it completely disappears upon reaching the stable state ES2.

The representation of the stable state ES2 therefore includes 7 hollow rectangular segments which embody the disappearance of a fictitious screen.

This mental representation of the stable state ES2 allows, for example, a user to intuitively perceive two possible maneuvers for opacifying the glazing from the stable state ES2:

- by ordering a change in opacity in the second direction 282, directed toward the front of the vehicle, the opaque zones will appear at the rear of the vehicle according to the transition ET23, as if the physical screen were reappearing at the rear of the glazing and being deployed toward the front of the vehicle,
- by ordering a change in opacity in the first direction 281, directed toward the rear of the vehicle, the opaque zones will appear at the front of the vehicle according to the transition ET24, as if the physical screen were reappearing at the front of the glazing and being deployed toward the rear of the vehicle.

Thus, the first mode of implementation of the control method creates a sensation of physical unrolling of a screen, which allows a user to intuitively understand the operation of the invention and to control the glazing simply as if they were controlling a physical screen. The first mode of implementation of the method thus makes it possible to make the operation according to the invention intuitive while benefiting from advantages over the use of a physical screen.

A first advantage arises from the multidirectional movement of the change in opacity, by virtue of which the front and rear passengers may choose a level of opacification independently of one another. This advantage is notably embodied by the possibility of reaching the stable state ES4 in which the partition 21 located at the front of the glazing is opaque while the partition 22 located at the rear of the glazing is clear.

A second advantage concerns the automatic control of the glazing according to a desired temperature and/or brightness in the passenger compartment, potentially combined with other functionalities of the vehicle, such as the air conditioning system for example.

Other advantages may be provided by the possibility for a user to configure the glazing partitions and the transitions between stable states defined on the basis of these partitions according to their needs.

Advantageously, the automatic glazing control could also be configured to use different sets of partitions 20 and levels of opacity depending on weather conditions. For example, the automatic glazing control could use

- a first set of partitions in a first sunshine configuration, this first set of partitions and levels of opacity making it possible in particular to have a different opacity in the front and rear parts of the passenger compartment to adapt the opacity of the glazing according to the direction of the sun's rays, and
- a second set of partitions and levels of opacity in a second sunshine configuration, this second set of partitions and levels of opacity making it possible, for example, to optimize the maintenance of a target temperature in the passenger compartment.

The invention claimed is:

1. A method for controlling an opacifying glazing for a motor vehicle, at least part of the glazing comprising a plurality of zones, the level of opacity of each zone being controlled individually to vary between a minimum value and a maximum value, the plurality of zones being arranged with sequence numbers i increasing in a first direction, the plurality of zones being grouped into a set of partitions comprising at least two partitions, each partition comprising a subset of the zones, the method being governed by a transition table defining a plurality of transitions between stable states of the glazing, each stable state being characterized by a homogeneous level of opacity across all zones of each partition, each transition in the transition table being determined by an initial stable state, a control direction, and a duration of a user command, and each transition specifying a final stable state, at least one selected partition the opacity of which is to be changed, a variation of the opacity of the at least one selected partition, and an order of zone sequencing, the method comprising the following steps:

determining, using the transition table, a transition from a current stable state to a final stable state of the glazing based on a detected user command comprising a control direction and a duration of pressing, the transition specifying the at least one selected partition, the variation of opacity, and the order of zone sequencing; and based on the determined transition:

increasing the opacity of the at least one selected partition comprising increases in the level of opacity of each zone of the at least one selected partition according to increasing functions of time, the increases being initialized zone after zone according to their increasing or decreasing sequence numbers i with a time lag between each zone when the variation of opacity is an increase in opacity, and/or reducing the opacity of the at least one selected partition comprising reductions in the level of opacity of each zone of the at least one selected partition according to decreasing functions of time, the reductions being initialized zone after zone according to their increasing or decreasing sequence numbers i with a time lag between each zone when the variation of opacity is a decrease in opacity.

2. The control method as claimed in claim 1, wherein the control method comprises, prior to the steps of increasing the opacity of the at least one selected partition and reducing the opacity of the at least one selected partition, a step of detecting a command to change the opacity of the at least one selected partition.

3. The control method as claimed in claim 2, wherein the step of detecting a command includes a sub-step of determining a control orientation either in the first direction, or in a second direction, opposite to the first direction and wherein the steps of increasing and reducing initiate, zone by zone, increases and reductions in opacity, respectively, according to the increasing sequence numbers i of the zones if the direction of control is determined in the first direction, or according to the decreasing sequence numbers i of the zones if the direction of control is determined in the second direction.

4. The control method as claimed in claim 3, wherein the sub-step of determining a control orientation includes:

detecting a direction of control indicated by a location of pressing, and/or a direction of pressing on a control button.

5. The control method as claimed in claim 1, wherein the increasing or decreasing functions of time of the opacity of the zones are linear or non-linear and/or in that the increasing or decreasing functions of time of the opacity of the zones are different depending on the zone in question.

6. The control method as claimed in claim 1, wherein the control method includes a step of automatic control of the glazing using data from a set of sensors.

7. The control method as claimed in claim 1, wherein:

a first order causes a phase of implementation of the method applied to a part of the glazing, and/or a second order causes a phase of implementation of the method applied to the whole of the glazing.

8. An opacifying glazing device, the device comprising hardware and/or software elements implementing the control method as claimed in claim 1.

9. A motor vehicle equipped with a glazing device as claimed in claim 8.

10. A computer program product comprising program code instructions recorded on a computer readable medium for implementing the control method as claimed in claim 1 when said program is operating on a computer.

11. A non-transitory data recording medium, readable by a computer, on which is recorded a computer program comprising program code instructions for implementing the control method as claimed in claim 1.

12. The control method as claimed in claim 1, wherein the time lag between successive zone commands varies over the increasing of the opacity or the decreasing of the opacity.

13. The control method as claimed in claim 1, wherein the increasing of the opacity or the decreasing of the opacity includes increasing or decreasing the level of opacity of each zone according to a non-linear zone voltage variation function.

14. The control method as claimed in claim 1, wherein the detecting comprises receiving a user selection of the final stable state of the glazing directly from a visual representation of possible stable states displayed on a human machine interface.

* * * * *